US011003640B2

(12) United States Patent
Goeser (10) Patent No.: US 11,003,640 B2
(45) Date of Patent: *May 11, 2021

(54) MINING OF POLICY DATA SOURCE DESCRIPTION BASED ON FILE, STORAGE AND APPLICATION META-DATA

(71) Applicant: International Business Machines Corporation, Armonk, NY (US)

(72) Inventor: Sebastian Goeser, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 251 days.

This patent is subject to a terminal disclaimer.

(21) Appl. No.: 16/174,765

(22) Filed: Oct. 30, 2018

(65) Prior Publication Data

US 2019/0065535 A1 Feb. 28, 2019

Related U.S. Application Data

(62) Division of application No. 14/746,909, filed on Jun. 23, 2015, now Pat. No. 10,146,809.

(30) Foreign Application Priority Data

Jul. 7, 2014 (GB) .................................. 1412027

(51) Int. Cl.
*G06F 16/00* (2019.01)
*G06F 16/215* (2019.01)
*G06F 16/2457* (2019.01)
*G06F 16/21* (2019.01)

(52) U.S. Cl.
CPC ...... *G06F 16/215* (2019.01); *G06F 16/24578* (2019.01); *G06F 16/212* (2019.01)

(58) Field of Classification Search
CPC ............ G06F 16/215; G06F 16/24578; G06F 16/212; G06F 16/285
See application file for complete search history.

(56) References Cited

U.S. PATENT DOCUMENTS

| | | |
|---|---|---|
| 6,195,657 B1 | 2/2001 | Rucker et al. |
| 6,587,876 B1 | 7/2003 | Mahon et al. |
| 7,418,489 B2 | 8/2008 | Sanghvi et al. |
| 7,587,418 B2 | 9/2009 | Hsu |
| 7,743,058 B2 | 6/2010 | Liu et al. |

(Continued)

OTHER PUBLICATIONS

Zhu et al., "Metadata Management with IBM InfoSphere Information Server", IBM, Redbooks, Oct. 2011, pp. 1-434.

(Continued)

*Primary Examiner* — Alexander Khong
(74) *Attorney, Agent, or Firm* — Michael A. Petrocelli (57) ABSTRACT

A method and system determines discrete policy target groups for information objects stored in an enterprise IT system. The method and system provide cleansed information about information objects stored on the enterprise IT system. Criteria for sorting the information objects is determined. Initial sorting of the information objects is carried out, resulting in an initial set of clusters. The information objects are clustered into discrete policy target groups based on the information about the information objects and the initial set of clusters, and human-understandable names and definite descriptions for policy target groups are computed.

8 Claims, 5 Drawing Sheets

(56) References Cited

U.S. PATENT DOCUMENTS

| | | | |
|---|---|---|---|
| 7,970,746 B2 | 6/2011 | Seshadri et al. | |
| 8,145,677 B2 | 3/2012 | Al-Shameri | |
| 2004/0143600 A1* | 7/2004 | Musgrove | G06F 16/951 |
| 2010/0011027 A1 | 1/2010 | Cox et al. | |
| 2013/0030865 A1 | 1/2013 | Villaverde et al. | |
| 2013/0067472 A1* | 3/2013 | Laverone | G06F 9/5061 |
| | | | 718/1 |
| 2013/0159301 A1 | 6/2013 | Okada et al. | |
| 2013/0159305 A1* | 6/2013 | Starks | G06F 16/35 |
| | | | 707/737 |
| 2015/0066939 A1* | 3/2015 | Misra | G06F 16/355 |
| | | | 707/739 |

OTHER PUBLICATIONS

Disclosed Anonymously, "Smarter Information Lifecycle Management", IP.com, No. 000207370, Electronic Publication: May 27, 2011, pp. 1-7.

IBM, "A Method for Effective Storing of Preservation Objects in an Enterprise Content Management (ECM) System", IP.com, No. 000188067, Electronic Publication: Sep. 22, 2009, pp. 1-5.

Geerts et al., Abstract of "Policy-Level Specifications in REA Enterprise Information Systems", Journal of Information Systems: Fall 2006, vol. 20, No. 2, pp. 37-63.

CGOC the Council, "Information Governance Benchmark Report in Global 1000 Companies", Oct. 2010, pp. 1-26.

Wu et al., "Probabilistic Unification-Based Integration of Syntactic and Semantic Preferences for Nominal Compounds", COLING '90 Proceedings of the 13th Conference on Computational Linguistics, vol. 2, 1990, pp. 413-418.

Kasper et al., "A Logical Semantics for Feature Structures", ACL '86 Proceedings of the 24th Annual Meeting on Association for Computational Linguistics, 1986, pp. 257-266.

IBM, "Atlas eDiscovery Process Management", http://www-03.ibm.com/software/products/en/atlasediscoveryprocmgmt/, Accessed on Apr. 22, 2015, pp. 1-2.

Gerasoulis et al, "Clustering Task Graphs for Message Passing Architectures", 1990, ACM, pp. 447-456.

Gerasoulis el al, "On the Granularity and Clustering of Directed Acyclic Task Graphs", 1993, IEEE, pp. 668-701.

Pending U.S. Appl. No. 14/746,909, filed Jan. 7, 2016, entitled "Mining of Policy Data Source Description Based on File, Storage and Application Meta-Data", pp. 1-27.

* cited by examiner

MINING OF POLICY DATA SOURCE DESCRIPTION BASED ON FILE, STORAGE AND APPLICATION META-DATA

BACKGROUND

The invention relates to computing systems, and more particularly to mining of policy data source descriptions.

An information system of an enterprise may store large amounts of data carrying information about different aspects of different enterprise issues as for, e.g., products. In different phases of such enterprise's issue, specific data concerning a specific process step of the enterprise's or company's workflow might be necessary for decision making or in litigation. For example, data might be due to being disposed of in order to free memory, or all information related to a specific product has to be prepared in a deliverable manner in case of a litigation situation. For enabling, e.g., rigorous compliance, defensible disposal or ediscovery (also known as discovery of electronically stored information ESI), a policy has to be applied to the data of interest.

In order to achieve these goals, a list of policy data sources (PDS) is necessary. A policy data source is a collection of business information objects such that a company policy can be applied to such collection. A PDS can be a physical repository, such as a file share or a database, but it can also be an organizational collection, as, e.g., all presentations from the marketing department. Generally, the task of obtaining a comprehensive list of policy data sources of an organization is rather tedious for the following reasons: i) The extreme heterogeneity of PDS in terms of content, structure, application dependence, storage, media, ownership, access rights, and organizational relevance, among others. ii) The need for a PDS to be absolutely discrete, i.e., disjunctive in a mathematical sense, or pairwise discrete, since, if the same stretch of information is covered by two different PDS, this may cause a policy conflict which cannot be solved except through human intervention. iii) The order of magnitude involved, since the number of information objects that policies may need to be applied to can be estimated to be in an order of magnitude of $10^6$ objects per employee.

An example for a policy data source could be "all pre-sales information on product XYZ" as defined within a company designing, manufacturing, marketing and selling product XYZ. Apparently, this particular policy data source, which we may designate as XYZ-PDS, will include material from several company divisions. The need for defining the data source XYZ-PDS arises immediately when, due to a design failure of product XYZ, legal control and eventually information change requests need to be executed over some parts of the XYZ-PDS.

At present, two solutions for solving the task of PDS list creation are known, which are currently being applied in companies having or working on an Information Technology (IT) system for the automatic application of policies:

Manual collection of policy data sources using office tools, meta-data obtained from crawling IT repositories, and interviews with employees responsible for collections. Sometimes, email-based tools for conducting these interviews are being used.

Data warehouse type of querying indexed meta-data collections obtained from crawling IT repositories, where the results of such queries are persisted with database means, e.g., as views or materialized query tables.

Both solutions are referred to in an "Information Governance Benchmark Report in Global 1000 Companies", issued by the CGOS's Council, to be found in the Internet under www.cgoc.com. The aforementioned solutions do not scale to a magnitude of billions of information objects and ten thousands of data sources, and cannot guarantee, with reasonable effort, the discreteness of a PDS. A further difficulty concerning the use of a policy data source is caused by the aforementioned heterogeneities, and consists in selecting the appropriate criteria for a grouping/sorting of said data.

An effective method of PDS list creation is necessary for a company to have the relevant data at hand at once, e.g., in the case of an ediscovery or in order to define appropriate policies with respect to, e.g., data retention, legal hold or defensible disposal.

A Policy Data Source and/or Policy Target—both being business objects—may be a target of information lifecycle governance. One challenge is how to define appropriate targets for policies on an enterprise scale.

Various prior art software systems provide tools to manage policies. They do not address, however, the question of how to obtain these policies in an effective way given an IT infrastructure and which IT objects belong to a given policy target group.

Other prior art software systems for information lifecycle governance tool are able to: collect meta-data about various IT objects stored on the enterprise IT system and build an index; offer datamarts ("infosets") on the information objects, which infosets are not Policy Targets as they are not discrete in all instances. This approach does not scale well enough to be applied in big enterprises. A further limitation of these software systems is that they expect the criteria for defining infosets to be known and/or given in advance.

SUMMARY

There is a need in the art to provide a method that overcomes shortcomings of the prior art.

It is an objective of embodiments of the invention to provide for an improved method for mining of policy data source descriptions, a computer system and a computer program product. Said objective is solved by the subject matter of the independent claims. Advantageous embodiments are described in the dependent claims.

In one aspect, the invention relates to a method for determining discrete policy target groups for information objects stored in an enterprise IT system. The method comprises providing cleansed information about information objects stored on the enterprise IT system; determining criteria for sorting the information objects; carrying out initial sorting of the information objects, resulting in an initial set of clusters; clustering the information objects into discrete policy target groups based on the information about the information objects and the initial set of clusters; and computing human-understandable names and definite descriptions for policy target groups.

In another aspect, the invention relates to a computer program product comprising computer executable instructions to perform a method for determining discrete policy target groups for information objects stored in an enterprise IT system. The method comprises providing cleansed information about information objects stored on the enterprise IT system; determining criteria for sorting the information objects; carrying out initial sorting of the information objects, resulting in an initial set of clusters; clustering the information objects into discrete policy target groups based on the information about the information objects and the initial set of clusters; and computing human-understandable names and definite descriptions for policy target groups.

In another aspect, the invention relates to a computer system for determining discrete policy target groups for information objects stored in an enterprise IT system. The computer system is arranged to perform the above method and comprises at least one harvester receiving an information flow from at least one storage device, wherein the at least one harvester is arranged to be able to receive the information flow from at least one storage device; at least one enterprise data model editor, arranged to enable a user to interactively edit an enterprise data model; at least one PDS harvester controller arranged to receive information flow from the at least one harvester and the at least one enterprise data model editor, the PDS harvester controller further being arranged to perform operations on the received information flow; at least one PDS description database (DB) arranged to receive an information flow from the PDS Harvester controller; and at least one cluster processor in engagement with the at least one PDS harvester controller.

BRIEF DESCRIPTION OF THE DRAWINGS

In the following, preferred embodiments of the invention will be described in greater detail by way of example only making reference to the drawings in which.

DETAILED DESCRIPTION

In the following, like numbered elements in these figures are either similar elements or perform an equivalent function. Elements which have been discussed previously will not necessarily be discussed in later figures if the function is equivalent.

The term "policy data source" as used herein refers to any business object, i.e., a container containing information objects, as, e.g., files, wherein the container is arranged to be manageable, by the company, with respect to, e.g., retention time, legal hold, ownership, and so on.

The term "policy target group" as used herein refers to business information or business information objects that are put into a form, by, e.g., cleansing information about information objects stored on the enterprise IT system and/or grouping, by the method as disclosed herein, in a manner that a policy can be defined or associated with the result after sorting and clustering the information objects. In other words, a policy target group can be understood to be the information of a plethora of files, wherein the meta-data concerning the files is prepared in such a manner, that only a few containers containing aggregated information result, which can be provided to be handled by a human, who might define a policy on one or more of the few aggregated containers, which policy could be executed, by the disclosed system, to be applied to all files of the plethora of files. From a human point of view, a policy target group may be, e.g., a couple of references to files that semantically belong together. As such, such group can be exposed to applying a policy, or, in other words, could be an easy-to-handle target of a policy. The disclosed method comprises the step of organizing discrete policy target groups with the aim of having not more than one policy for each concerned business information object. Physically, a policy target group may be represented by a database record.

It seems desirable to have a method of determining discrete policy target groups available which is based on meta-data of information objects and uses data and text mining approach. The proposed method, when implemented in software, is desirably able to serve as a connector to a prior software system as mentioned above. It is further desirable that the method is able to use data from various data collection tools of different vendors as input.

In advance, before the method disclosed herein is started, there might be the situation that there is no actual policy regarding the business objects nor any knowledge as to how such policy should be drafted.

It is to be understood that the method step of carrying out the initial sorting of the information objects may result in an initial clustering having an initial set of clusters. It is further to be understood that the method step of clustering the information objects into discrete policy target groups based on the information about the information objects and the initial set of clusters may be performed by using a data mining approach to cluster the information objects.

The features of the disclosed method may have the advantage of, after having crawled over the complete company's data accompanied by executing the disclosed method, supporting a user in defining a policy concerning a specific product in regard to a specific stage of the company's workflow. For example, all files relating to one specific product in the realm of presales could be treated in a similar manner. Such files could be associated, or grouped, by allocating them or references to them in one container.

After the disclosed method has finished, a policy might be defined, e.g. interactively. For example, such files could be associated, or grouped, by allocating them in a container. A policy of interest might be "dispose of all files in this container after a time lapse of 4 years calculated from this very moment on". The skilled person will understand that there is no need to physically copy or move all the associated files into the container of interest. The grouping might be achieved by storing file references in the container of interest.

The term "cleansed data" as used herein refers to preparing the raw data as stored in the company's IT to be exposed to certain rules. Such preparation is necessary since, usually, raw data might be inappropriate for a step of sorting. One example of "cleansed data" might be data that is formatted employing certain rules to be treated by certain different rules: For example, in some countries the 1st of May in 2014 reads "May 1, 2014" or "May 1, 2014", whereas it might be necessary for a subsequent process of, e.g. sorting data, to have such kind of data in the format of "2014 May 1". A more complex example might involve the usage of a parser evaluating expressions into, e.g. comma separated, multiple attribute values. Based on cleansed information about the information objects stored on the IT system of the enterprise, as exemplarily illustrated above, the further method steps can be performed.

The process of "computing a human-understandable name" can be performed on some input data, be it raw data or cleansed data, and can comprise i) formatting the input data and/or ii) applying a prior knowledge about the semantics of the input data in order to create a human-understandable expression or name. For example, an input data of "\\gcg118nas002\GCG118_NASFS04$\APPS\TD_Payments\Images" might be computed to read "Payment related images stored on NAS-Server #2", which can be achieved by applying a computer-linguistic procedure generally known to the skilled person.

By various prior art techniques, meta-data of files, of storage devices or of application elements, i.e. of information objects, can be harvested from a landscape of IT servers. A basis of the disclosed method is the use of techniques from data and text mining to build groups of such information objects, and generate human-readable descriptions, so that non-IT personnel can use these described groups as PDS's, and, e.g. apply retention policies to them. As a result, discrete policy target groups may have been obtained.

In this way, the disclosed method avoids the drawbacks of both manual and database-oriented generation of PDS's. It provides a method for automatically obtaining tens of thousands of PDS descriptions from billions of information objects, which can be proven to scale both horizontally and vertically. It addresses the problem of PDS heterogeneity since it does not require any a priori decision on grouping criteria for the information objects. Further, the method is guaranteed to provide discrete PDS descriptions whenever it is applied.

Based on intensive experimentation with real-life data, the inventors found the method disclosed herein, namely combining a specialized preprocessing of meta-data with a hierarchical clustering algorithm, which uses an Euclidean distance measure, the method as a result providing the best lists of PDS descriptions. The details of the method are disclosed below together with the appended drawings.

It is considered to provide a computer system that is able to execute the method when implemented as a software program, in any of the method's embodiments described herein. It is further considered to provide a computer program product comprising computer executable instructions to perform the method steps of the disclosed method in any of the embodiments as described herein.

The features of the disclosed method may have the advantage of enabling a user to get discrete PDS descriptions provided without entering a priori data, so that a company's policy may be easily established on the basis of and applied to a number of information objects.

Figure 1:
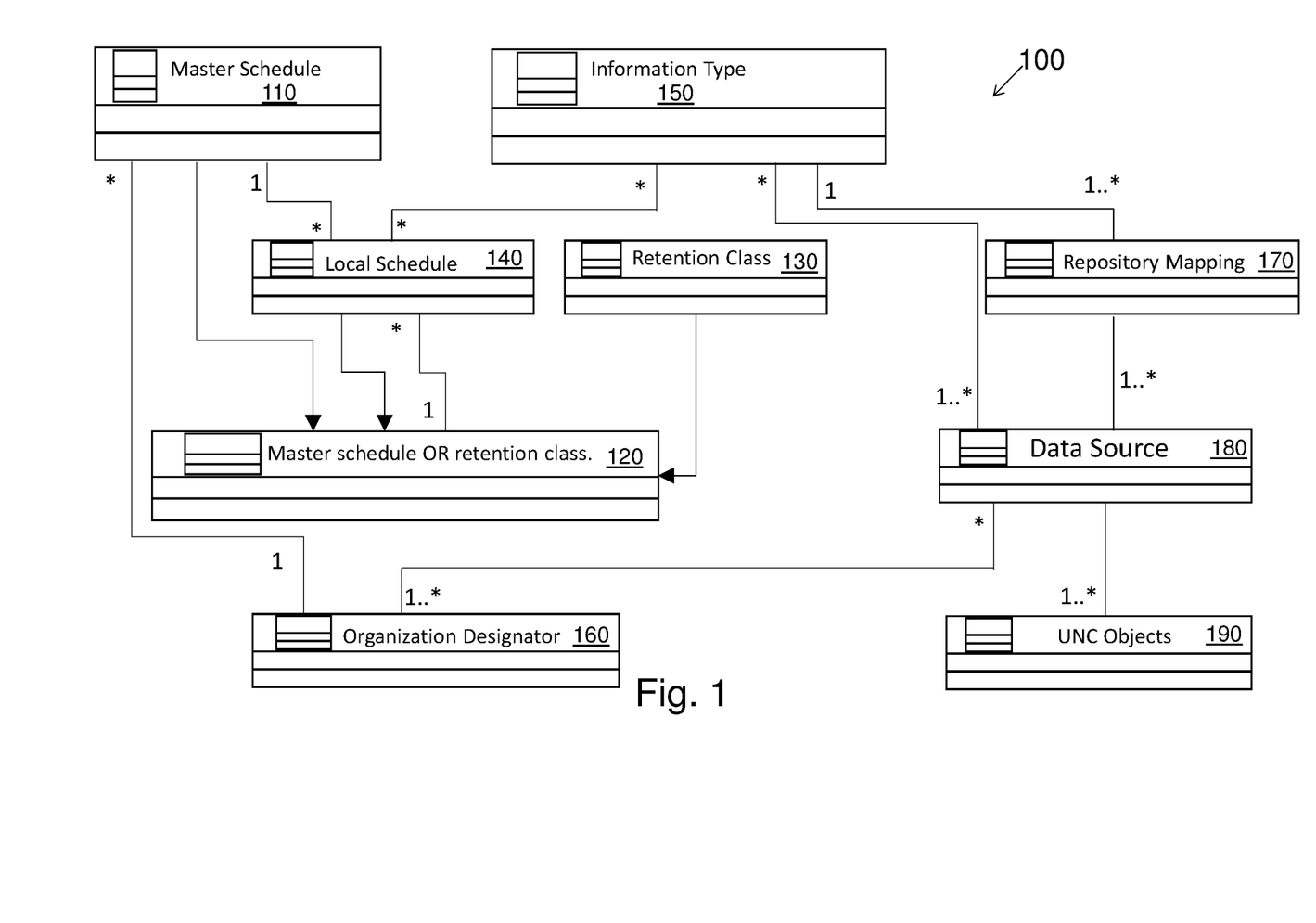
FIG. 1 illustrates an example of a policy data source in the context of an exemplary data model.

FIG. 1 illustrates an example of an entity relationship (ER) model 100 for an embedding of a policy data source 100, within a prior art policy management, in the context of an exemplary data model. It shows that for each (policy) data source, there is at most one local schedule, e.g., as a non-limiting example only, specific retention policy, to be applied to this PDS. The entity relationship model might be implemented, as a skilled person will readily appreciate, by employing an SQL-based RDBMS (Relational Data Base Management System based on management using Structured Query Language) for the definition of tables.

The policy data source, herein exemplarily presented as an ER model, that might be used for storing policy rules that are to be applied to information objects can comprise a designator of a Universal Naming Convention (UNC) designated object 190 that is associated with a data source 180, that can be one of multiple data sources of an organization designator 160 in the company. A repository mapping 170 supports in finding the physical information objects associated with the UNC object 190 of interest. A master schedule 110, master schedule OR retention class 120, retention class 130 and local schedule 140 are data structures combinedly provided to store a policy, e.g. a retention policy, to be applied to the UNC objects 190. The local schedule 140, repository mapping 170 and data source 180 can be assigned to an information type 150.

The method disclosed herein can make use of certain techniques from the field of data and text mining to learn groups of such information objects, and generate, for each such group, human-readable descriptions in the form of a PDS description. Such a description may be used by non-IT personnel to, e.g., apply retention policies automatically. The disclosed method makes use of diverse techniques known to the skilled person to harvest meta-data of files, of storage devices or of application elements, i.e. information objects, from a given landscape of IT servers and uses them as input for mining PDS descriptions.

In this way, the disclosed method avoids the drawbacks of both manual and database-oriented generation of a PDS. The disclosed method is able to automatically obtain, e.g., tens of thousand PDS descriptions from billions of information objects, and can be proven to scale both horizontally and vertically. It addresses the problem of PDS heterogeneity since it does not require any a priori decision on grouping criteria for the information objects. Further, the method is guaranteed to provide sets of pairwise discrete PDS descriptions whenever it is applied. As such, the disclosed method can be regarded as a method of mining PDS descriptions.

Figure 2:
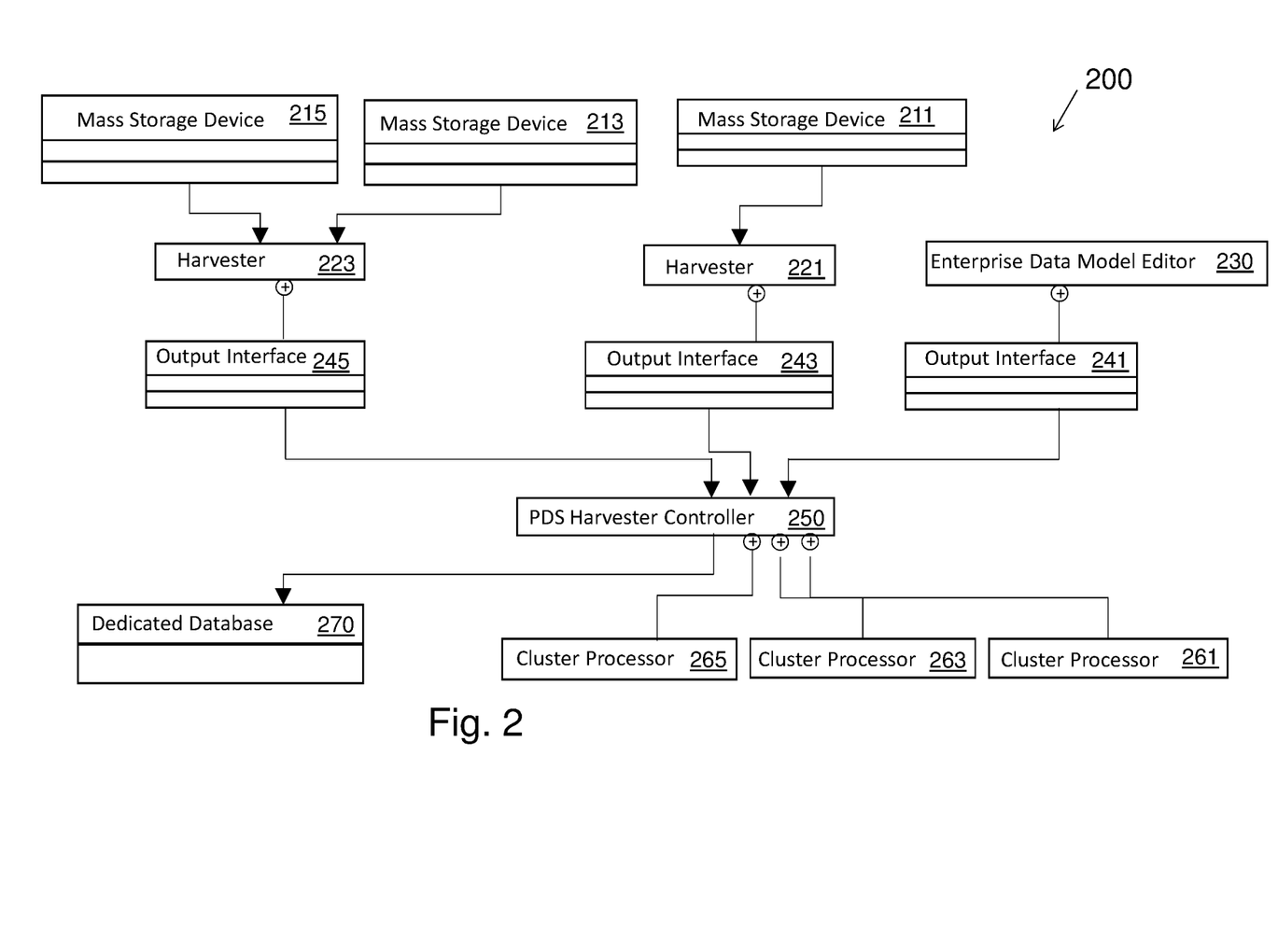
FIG. 2 illustrates an exemplary software system for PDS description mining.

FIG. 2 illustrates an exemplary software system 200 for PDS description mining. The method disclosed herein may be executed on a computer system as described below, with no or nearly no human intervention, i.e. automatically or, at least, nearly automatically. The software system of FIG. 2, represented as a component diagram, may be capable of performing an automatic mining computation as is described with regard to the disclosed method.

Information may be transferred from several storage devices or mass storage devices 211, 213, 215 on which might run a specific system capable of or dedicated to managing large amounts of files, such as storage management or file systems. Components 221 and 223, also known as harvesters, receive the information flows from the mass storage devices 211, 213 and 215, using the protocols and interfaces offered through the specific systems. In this way, the harvesters 221 and 223 are able to obtain a comprehensive list of meta-data records, each record comprising a set of meta-data attributes with zero or one value. A multi-value attribute would be considered, in this perspective, as an attribute with a single complex value.

An enterprise data model editor 230 provides a user with a user interface to a database to interactively edit a data model relating to the company's information objects of interest and allows to manage the company's persons, roles organization, data, etc.

The data harvesters 221 and 223 and the enterprise data model editor 230 provide their respective outputs via respective output interfaces 241, 243, and 245 in a tabular format that is supported by the output interfaces. Through these output interfaces, a PDS harvester controller 250 receives its tabular input. A mining operation can be performed, through a clustering algorithm, which writes its results, i.e. a set of levels, each level consisting of a set of PDS description, into a dedicated database 270. The PDS harvester controller 250 cooperates with one or more cluster processors 261, 263, 265.

The skilled person will appreciate that each of the above components may be implemented on one computer for each respective component, or, alternatively, more than one component might be implemented on one computer.

The PDS description computation uses a novel representation of PDS descriptions through so-called acyclic directed graphs, abbreviated as adg's, wherein the adg representation formalism originates from graph theory, as for example from Robert T. Kasper and William C. Rounds "A Logical Semantics for Feature Structures". An adg is a functional object satisfying the following two key requirements for the computation of PDS descriptions:

Due to an adg being inherently of partial order, an adg allows to accumulate information about a PDS in a non-destructive manner, so that, if new information gets to be known about a PDS, it enhances the already existing information through a well-defined operation called unification, as introductorily described in the article of Kasper and Rounds.

In order to represent the probability that a certain set of information objects belongs to an already existing PDS, adg's, as well as a unification operation, can be interpreted through a Bayesian probability in the following way:

$$P(c_1 \cup c_2) = P(c_1 \cup c_2 | c_1, c_2) * p(c_1) * p(c_2)$$

wherein $c_1 \cup c_2$ might be called the unification of two clusters $c_1$ and $c_2$ representing the least upper bound of the respective feature sets.

An alternative way of probabilistic unification is described in the article of Dekai Wu "Probabilistic Unification-Based Integration of Syntactic and Semantic Preferences For Nominal Compounds".

Figure 3:
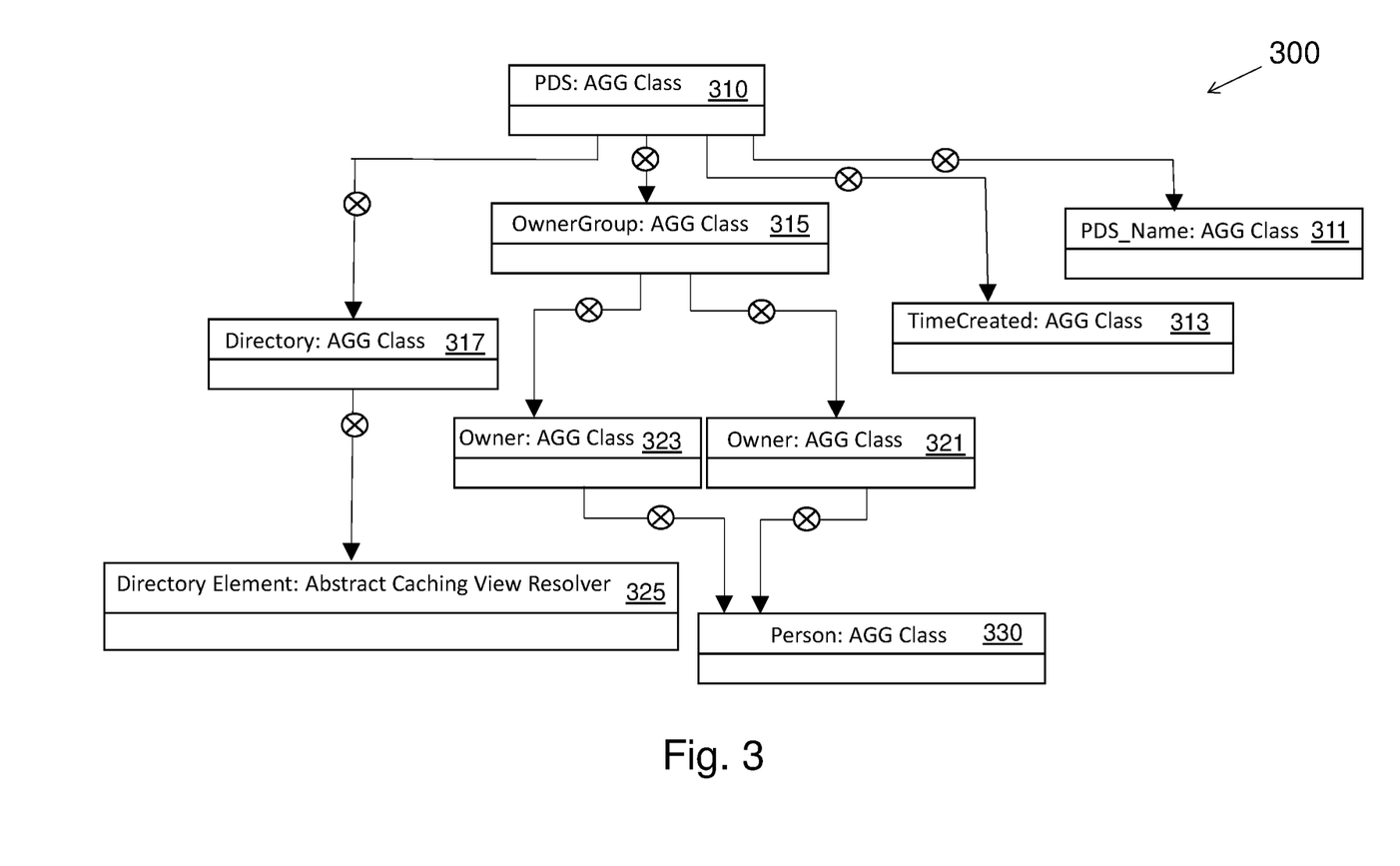
FIG. 3 illustrates an exemplary acyclic directed graph modeling a PDS.

FIG. 3 illustrates an exemplary acyclic directed graph 300 modelling a PDS, wherein the nodes are classes in the sense of an UML 2.0 class diagram and the linking lines represent a simple feature semantic in the sense of "a class has a name", as for example: A class "PDS: AGG Class" 310 has—as members—a class "PDS Name: AGG Class" 311 semantically representing a name, a class "TimeCreated: AGG Class" 313, semantically representing a time stamp, a class "OwnerGroup: AGG Class" 315 semantically representing an owner group, e.g., of the information object of interest, and a class "Directory: AGG Class" 317 semantically representing the directory path, e.g., wherein the information object is physically stored. The class "Directory: AGG Class" 317 has as a member a "Directory Element: Abstract Caching View Resolver" 325. The class "OwnerGroup: AGG Class" 315 has as at least one member a class "Owner: AGG Class" 321, or a second class "Owner: AGG Class" 323. Finally, the classes "Owner: AGG Class" 321 and "Owner: AGG Class" 323 are, respectively, provided with a member class "Person: AGG Class" 330.

Figure 4:
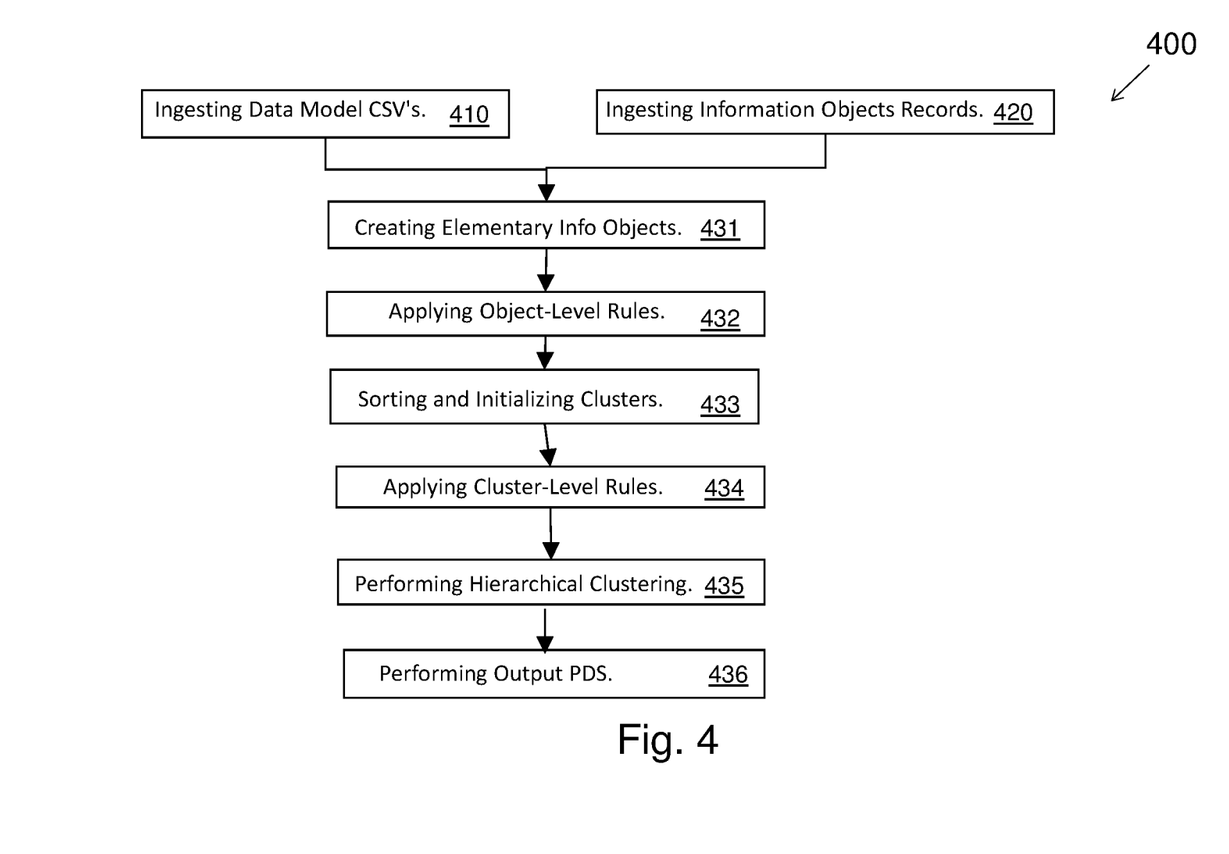
FIG. 4 exemplarily illustrates processing steps of PDS description mining.

FIG. 4 exemplarily illustrates processing steps of PDS description mining 400, comprising steps of data ingestion: Ingesting data model CSV's 410 and ingesting information objects records 420; the data preprocessing steps of creating elementary info objects 431, applying object-level rules 432, sorting and initializing clusters 433, applying cluster-level rules 434, and performing hierarchical clustering 435; finally, output PDS by level 436 is performed. Further, a quality of such cluster may be determined by means of a metric. The aforementioned steps will be set forth in detail below.

At first, an ingest of meta-data and enterprise model information is performed. A harvested technical description of an information object may comprise, e.g., a file, as shown below, or a server or web application which typically consists of meta-data attributes or a timestamp as, for example, "Date Created", "Fully Qualified file name" or "Owner". Such description of a single information object could, e.g., have the following appearance (with or without '|'):

2013-03-03T23:53:43Z | Success | +2007-10-30T18:38:59:000+00:00-UTC | +2005-02-27T13:57:21:000+00:00-UTC | '.tif' | '\\gcg118nas002\GCG118_NASFS04$\APPS\TD_Payments\Images\20000121\0006\'| '00175R.tif' | 12709 | +2000-01-21T13:52:52:000+00:00-UTC | 'BUILTIN\Administrators'

An enterprise model information covers at least a company's organization, person, and role data, with person information containing login/user identification to be related with ownership meta-data for a major subset of information objects. Such enterprise information is available, e.g., from the product IBM Atlas, as can be found, e.g., on http://www-03.ibm.com/software/products/de/atlasediscovery-procmgmt.

Subsequently, object-level rules will be applied: Attribute value re-writing rules are being applied to individual information objects when turning them into internal elementary objects (ieo's). This processing step is highly harvester-specific and breaks complex meta-data values into more elementary ones, if the latter bear an independent semantics. E.g., in the example above, the content of the 10th field "field10('BUILTIN\Administrators')" might be broken down into "DomainName('BUILTIN')" and "UserGroup('Administrators')".

As a next step, sorting, then initializing clusters is performed: Based on integer weights for the ieo meta-data fields, the list of ieo's is being sorted into initial clusters of level 0. At the same time, a de-duplication is performed.

The following step comprises applying of cluster-level-rules: In this step, attribute value re-writing rules applied to two or more ieo's serve two main purposes, namely to combine related meta-data values of the ieo's into a single attribute value of the initial cluster, and to generate a human-readable name and a description for the cluster: An example for the first type of rule application would be to collapse all files of a cluster with the same directory path prefix into a directory structure annotated as value of a cluster attribute. As an example for the second type of rule application, based on meta-data values for "Extension", "Date created" and/or "Owner", a PDS description field like "Dave's old archive files" might be generated.

The subsequent step concerns a hierarchical clustering that is performed in a manner described below.

In a final step, clusters are output by level: The hierarchical clustering algorithm generates a tree structure of clusters where each cluster of level n>0 refers to k>0 clusters of a level n'<n. The cluster level to be output should be chosen as the largest level that can be administered from a business perspective. It is to be noted that clusters from different levels may be not discrete.

A basic idea of the PDS descriptions mining algorithm is to find a set of PDS descriptions which is minimal with respect to the set of ieo's to be clustered. Assuming that a PDS description is approximated through a cluster structure c, it is considered that the set of value-bearing meta-data attributes val(c) to be as small as possible and the number #ieo(c) of ieo's covered by c as large as possible, so that the following formula (I) holds:

$$\lim_{i \to \infty} \frac{\#val(c_i)}{\#ieo(c_i)} = 0 \qquad (I)$$

The mining algorithm described below uses Euclidean distance measure shown in formula (II). Through choosing, for each cluster level and each pair of clusters, the two most similar clusters to unify, it reduces statistically the number of value-bearing attributes.

$$\text{distance}(c_i, c_j) = \Sigma_{v \in V(p)} (f(v_i) - f(v_j))^2 ) * W(p) \quad \text{(II)}$$

where V(p) is the set of values for the meta data attribute p, and $f(v_i)$, $f(v_j)$ are the absolute frequencies of occurrence for the values $v_i$, $v_j$ of the property p, respectively. The symbol W with $0<W(p)<=1$ may represent the weight associated with property p, so that a skilled person can put a higher emphasis on, e.g., the organization versus the owner name attribute. In addition, it is required that two clusters to be unified need to be compatible, which means that they have, for all meta-data attributes, no pair of values which has been declared incompatible.

With regard to the above given Bayes formula, a probability for a unified term may be determined based on the corresponding probabilities for partial clusters. Thus, the Bayes probability may be an indicator for a quality of a cluster in relation to other clusters. As a result, it may not only be determined, whether two clusters are close enough to each other, i.e., of minimal Euclidean distance to each other, but also, whether the quality is sufficient for unification. One goal might be to describe as much files as possible with as few attribute values as possible, which may be achieved by the novel application of the Bayes formula for the disclosed method for determining discrete policy target groups for information objects stored in an enterprise IT system.

Figure 5:
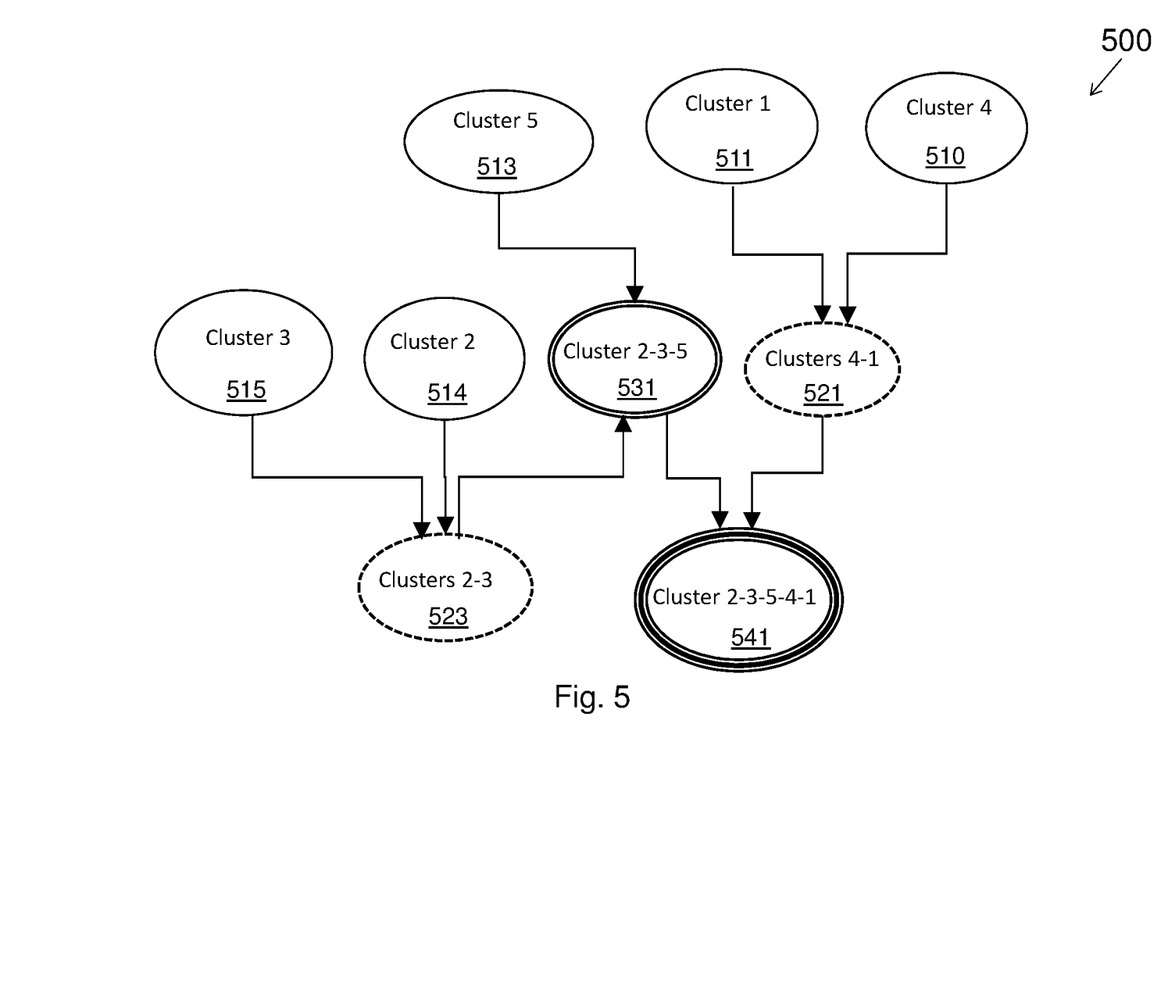
FIG. 5 depicts an example of a binary cluster tree resulting from an operation of the aforementioned process performed on an aforementioned computer system, using an aforementioned policy data source and aforementioned acyclic directed graph.

The output of the clustering algorithm is a binary tree structure as depicted in FIG. 5, wherein each arrow points from a lower to a higher clustering level. It is to be noted that each cluster of level n>1 has two predecessors from one or two lower levels, on the highest level being only one cluster.

The above process and algorithm might be implemented in computer software which might be deliverable on a computer-readable storage medium, e.g., as a software product or computer program product.

FIG. 5 depicts an example of a binary cluster tree 500 resulting from an operation of the aforementioned process performed on an aforementioned computer system, using a policy data source and an acyclic directed graph. Clusters "Cluster 4" 510, "Cluster 1" 511, "Cluster 5" 513, "Cluster 2" 514 and "Cluster 3" 515 are clusters of the lowest level, or, initial clusters, in FIG. 5. Due to clustering of ieo's, clusters 510 and 511 are the predecessors of cluster "Cluster 4-1" 521 which is one level higher than its predecessors. In a similar manner, cluster 513 is one of the predecessors of cluster "Cluster 2-3-5" 531, and clusters 514 and 516 are the predecessors of "Cluster 2-3" 523, which is the other predecessor of cluster 531. Finally, clusters "Cluster 4-1" 521 and "Cluster 2-3-5" together are the predecessors of highest-level "Cluster 2-3-5-4-1" 541.

Herein, an algorithm for PDS descriptions mining is suggested, which is a binary divide-and-conquer clustering algorithm with a centroid-based distance function. This algorithm has a worst case complexity proportional to $(n/2)^2$ with n being the number of initial clusters. Processing time decreases exponentially by level, because each cluster can go into at most one unification from the right side, so that each level l>1 has approximately half the number of clusters from the previous level l1. The algorithm has a distance function d(i,j) computed on the centroids of the left side and right side clusters $c_i$ and $c_j$, respectively, so that no quadratic effort is needed for computing all pairwise distances $d(c_{i,k}, c_{j,m})$ of sub-clusters within $c_i$, $c_j$.

```
(i)  LET C = c__(1,1) ..., c__(1,n) be a list of clusters of the initial level 1
     LET newClusterfound = true
     WHILE (newClusterFound)
     {
         newClusterFound = false
         FOR all unused clusters c__(l,i) of level l>0
         {
             GET a cluster c__(m,j) with m <= l such that
                 (I) c__(m,j) =/= c__(l,i) AND
                 (i) ALL (c__(m,k), k=/= j:
                     d(c__(l,i), c__(m,k)j) <= d(c__(l,i), c__(m,j)) AND
                 (ii) compatible(c__(l,i), c__(m,j))
                 {
                     Make a new cluster c__(l+1,i) =           unify(c__(l,i),
                                                c__(m,j))
                     LET i = i+1
                     LET c__(m,j) = used
                     LET newClusterFound = true
                 }
         }
         LET l = l+1
     }
```

Some explanations on the functions used in above pseudo-code are given as follows:
(a) c=unify(c_1, c_2) is called the unification of two clusters c_1 and c_2 and represents the least upper bound of the respective feature sets.
(b) compatible (c_1, c_2) is a Boolean function which evaluates to TRUE if and only if there are no two feature value pairs f_1, f_2 in the respective clusters which are incompatible.
(c) $d(c_1, c_2)$ is a function returning the Euclidean distance of two clusters $c_1$, $c_2$, according to formula (II).

To summarize, mining policy data source descriptions from file and storage meta-data together with enterprise model data is a new method for obtaining PDS's. It solves the scalability and discreteness problems inherent in all previously used methods for obtaining PDS descriptions. The method includes various dedicated techniques for processing file and storage meta-data in connection with enterprise model data, as well as clustering algorithm for learning a hierarchical cluster structure that sets of policy data source descriptions can be derived from.

The present disclosure provides embodiments for an improved method for mining of policy data source descriptions, and a computer system and a computer program product for the same.

In one embodiment of the present disclosure, a method for determining discrete policy target groups for information objects stored in an enterprise IT system. The method comprises providing cleansed information about information objects stored on the enterprise IT system; determining criteria for sorting the information objects; carrying out initial sorting of the information objects, resulting in an initial set of clusters; clustering the information objects into discrete policy target groups based on the information about the information objects and the initial set of clusters; and computing human-understandable names and definite descriptions for policy target groups.

In one embodiment of the present disclosure a computer program product comprising computer executable instructions is provided to perform the method steps of the method of any one of the embodiments of the present disclosure.

In one embodiment of the present disclosure, a computer system for determining discrete policy target groups for information objects stored in an enterprise IT system. The computer system is arranged to perform the above method and comprises at least one harvester receiving an information flow from at least one storage device, wherein the at least one harvester is arranged to be able to receive the information flow from at least one storage device; at least one enterprise data model editor, arranged to enable a user to interactively edit an enterprise data model; at least one PDS harvester controller arranged to receive information flow from the at least one harvester and the at least one enterprise data model editor, the PDS harvester controller further being arranged to perform operations on the received information flow; at least one PDS description database (DB) arranged to receive an information flow from the PDS Harvester controller; and at least one cluster processor in engagement with the at least one PDS harvester controller.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. The amount of processing resources may indicate the use degree of each of the physical components such as CPU, memory, and N/W bandwidth included in the computer system and their money cost. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A system for determining discrete policy target groups for information objects stored in an enterprise IT system, comprising:
   a computer system including a computer processor, and a computer-readable storage medium;
   program instructions stored on the computer-readable storage medium being executable by the processor, to cause the computer system to:
      receive information about information objects from a data storage device, using a harvester, including ingesting information object records to generate meta data based on the received information about the information objects;
      generate internal elementary objects, which includes breaking complex meta-data values of the generated meta data into more elementary meta-data values;
      combine related meta-data values of the internal elementary objects into a single attribute value of an initial cluster;
      sort the information objects based on criteria being based on integer weights for meta-data fields of the internal elementary objects;
      generate an initial set of clusters resulting from the sort;
      cluster the information objects into discrete policy target groups, using a harvester controller, based on the information about the information objects and the initial set of clusters; and
      compute human-understandable names and definite descriptions for the policy target groups.

2. The system of claim 1, further causing the computer system to:
   determine the quality of such clusters by means of a metric.

3. The system of claim 1, wherein the criteria for sorting the information objects is performed interactively.

4. The system of claim 1, further causing the computer system to:
   describe properties of the clusters using directed acyclic graphs.

5. The system of claim 1, wherein the clustering of the information objects is performed by using a hierarchical clustering algorithm to cluster the information objects into the discrete policy target groups, the hierarchical clustering algorithm providing multiple levels of granularity of clusters, clusters on a less granular level being unions of clusters on a more granular level.

6. The system of claim 5, further causing the computer system to:
   allow a user to select a number of policy groups by selecting an appropriate granularity level.

7. The system of claim 1, wherein the computing of human-understandable names and definite descriptions is performed using a knowledge base of human-understandable expressions and an appropriate set of term construction rules.

8. The system of claim 1, further causing the computer system to:
   generate a set of (Policy Data Sources) PDS descriptions which meets a criterion of being minimal with respect to internal elementary objects to be clustered, the criterion of being minimal being determined based on an Euclidean distance measure $$\text{distance}(c_i, c_j) = \Sigma_{v \in V(p)} (f(v_i) - f(v_j))^2) * W(p)$$

wherein distance $(c_i, c_j)$ refers to the Euclidean distance between the clusters $c_i$ and $c_j$, $v_i$ and $v_j$ refer to values for the meta-data attribute p, V(p) being a set of appropriate values for the meta-data attribute p, W(p) being a weight associated with the property p, and $f(v_i)$, $f(v_j)$ the absolute frequencies of occurrence for the values $v_i$, $v_j$ of p, respectively.

* * * * *